United States Patent [19]

Cagle

[11] 4,031,918

[45] June 28, 1977

[54] ROTARY SPOOL VALVE

[75] Inventor: Harlan R. Cagle, Cheboygan, Mich.

[73] Assignee: Sahlin International, Inc., Birmingham, Mich.

[22] Filed: May 24, 1976

[21] Appl. No.: 689,007

[52] U.S. Cl. .................. 137/625.23; 137/625.47; 251/317; 251/309; 251/DIG. 1

[51] Int. Cl.² .................................... F16K 11/07

[58] Field of Search ........... 137/625.23, 625.47; 251/317, 309, 314, DIG. 1

[56] References Cited

UNITED STATES PATENTS

| | | | |
|---|---|---|---|
| 2,585,556 | 2/1952 | Johnson | 251/DIG. 1 |
| 3,033,226 | 5/1962 | Allen | 251/317 X |
| 3,538,952 | 11/1970 | Bayer | 137/625.17 |
| 3,938,553 | 2/1976 | Ortega | 137/625.47 |

Primary Examiner—Alan Cohan
Attorney, Agent, or Firm—Harness, Dickey & Pierce

[57] ABSTRACT

A fluid flow control valve has a rotary spool with one or more standard, circular O-rings held in stretched condition by shoulders on the spool so that instead of extending all the way around the circumference of the spool each O-ring extends only a part of the way around the circumference and has two longitudinally extending sections as well as two arcuate circumferential sections that serve to seal the spool in the spool bore both during movement and while it is in a selected fluid flow controlling position.

17 Claims, 9 Drawing Figures

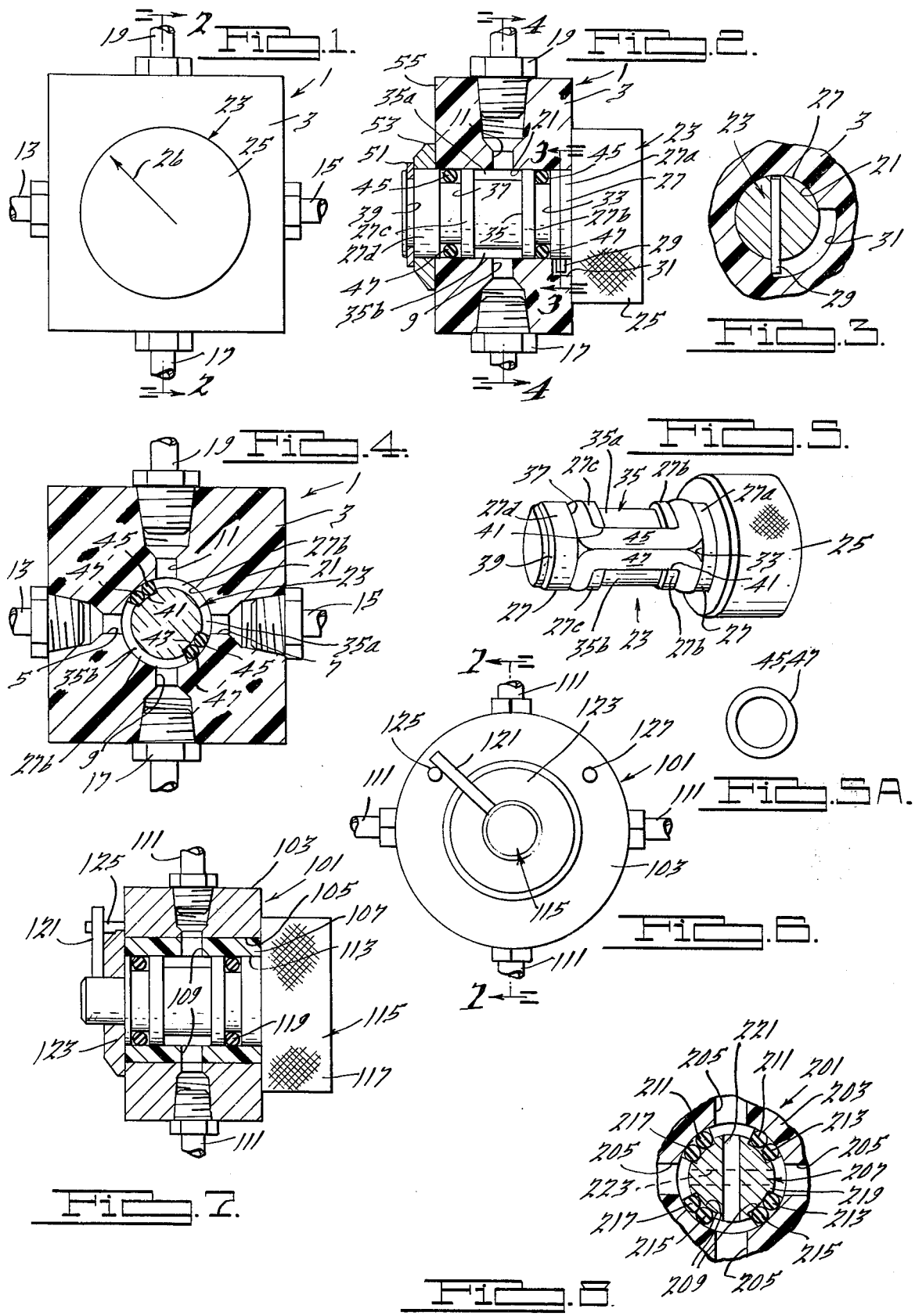

ROTARY SPOOL VALVE

BRIEF SUMMARY OF THE INVENTION

It is the purpose of this invention to provide an improved spool or selector valve member for fluid flow control valves.

The invention accomplishes this purpose by the use of standard, circular O-rings, or the equivalent, which are mounted on the external surface of the spool in such a way that they extend less than all the way (360°) around the circumference of the spool. For example, in presently preferred forms for rotary spools they extend one half or one quarter of the way around the circumference. When so mounted, the O-rings have two longitudinally extending sections and two arcuate circumferential sections which serve to define and seal a movable flow control chamber between the spool and the spool bore.

DESCRIPTION OF THE DRAWINGS

FIG. 1 is a front elevation of a rotary spool type four way valve selected to illustrate an embodiment of the invention;

FIG. 2 is a cross section along the line 2—2 of FIG. 1;

FIG. 3 is a cross section, partly broken away, along the line 3—3 of FIG. 2;

FIG. 4 is a cross section along the line 4—4 of FIG. 2;

FIG. 5 is a perspective view of one form of rotary valve spool of this invention, being the form used in the valves of FIGS. 1—7 and utilizing two longitudinally stretched O-rings;

FIG. 5A is a plan view reduced in size of either O-ring used in FIG. 5 in relaxed condition prior to stretching and assembly in accordance with the invention;

FIG. 6 is a rear elevation of a slightly modified form of rotary spool four way valve as compared with the embodiment of FIGS. 1–4;

FIG. 7 is a cross section along the line 7—7 of FIG. 6; and

FIG. 8 is a broken away cross section, similar to the center of FIG. 4, showing a modified form of rotary valve spool utilizing four stretched O-rings.

DESCRIPTION OF THE INVENTION

For the sake of illustrating rather than limiting the invention, a four way valve 1 is illustrated in FIGS. 1–4 which has a square valve body 3 with four pipe threaded fluid flow ports 5, 7, 9, and 11 into which are respectively threaded fitting and conduit combinations 13, 15, 17, and 19. The ports are spaced 90° apart and extend radially with respect to the uniform diameter valve spool bore 21 that extends through the body 3 and into which each of the ports opens. A rotary valve spool assembly 23 embodying the invention is disposed within the bore 21 to control flow among the ports. For the sake of illustration, it will be assumed that port 5 is connected via conduit assembly 13 to a pressure source and is therefore the pressure inlet. Also, port 7 will be assumed to be the exhaust port and connected via conduit assembly 15 to atmosphere (if the pressure fluid is air) or to the tank or other desired location if liquid or various gases are used as the pressure fluid. Ports 9 and 11 are assumed to be connected via their respective conduit assemblies 17 and 19 to a pressure operated device (not shown), for example opposite sides of the piston in a pressure cylinder. Though the detailed structure will be described hereinafter, it can be seen in FIG. 4 that the spool assembly is such that when pressure inlet port 5 is connected to operating port 9, the other operating port 11 is connected to the exhaust port 7. Thus, if the device is used to supply pressure to a pressure cylinder, the valve 1 will serve to connect one side of the piston to the pressure source and the other side to exhaust. Obviously, many other applications of the valve 1 are possible, including the use of combinations or batteries of valves.

The spool assembly 23 has a handle or operating portion 25 which is illustrated as an enlarged knurled cylindrical section in the drawings for easy manual operation with an arrow 26 (FIG. 1) to visually indicate its rotary position. Obviously, the portion 25 could be in the form of a lever, etc., or it can be designed for mechanical or pressure actuated (rather than manual) operation. Thus, the operating portion 25 is the part of the spool assembly 23 that receives both clockwise or counterclockwise torque so that the assembly can be rotated to the desired angular position.

In the form of spool assembly illustrated there is a smaller diameter, cylindrical shank 27 coaxial with the handle 25 and adjacent to the handle it has a diametral aperture (FIGS. 2–3) in which is press fitted a limit positioning pin 29 that projects radially beyond the outer surface of the shank for a short distance. The projecting portion of pin 29 is received in an arc-shaped 90° cut-out 31 in the face 33 of the body 3, the cut-out being covered by enlarged handle 25 as can be seen in FIGS. 2–3. Engagement of the pin 29 with either end of the cut-out 31 prevents further rotary movement of the spool assembly 23 so it can be seen that they form a means for restricting rotary movement to 90° in the embodiment illustrated.

The shank 27 is of a diameter to smoothly but rotatably fit the wall of bore 21 but has four separate annular grooves 33, 35, 37, and 39 formed in it which are parallel to each other and define planes perpendicular to the spool axis. The grooves subdivide the shank 27 into four portions 27a, 27b, 27c, and 27d which have outer surfaces that movably engage the wall of bore 21.

The shank 27 has axial grooves 41 formed on one side which cut through walls 27b and 27c and axial grooves 43 diametrically opposite to grooves 41 which also cut through walls 27b and 27c. The axial grooves 41 and 43 and the annular grooves 33 and 37 serve to hold two O-rings 45 and 47 in stretched condition on the shank 27. Prior to assembly on the shank, the O-rings are preferably of conventional circular shape, as seen in FIG. 5A, and have circular cross sections as seen in FIGS. 2 and 4.

The O-rings are stretched lengthwise of the shank and laid in the grooves mentioned so that each has substantially semi-circular arcuate sections in separate parts of grooves 33 and 37 and straight axial sections jointly, compressed together side by side, in grooves 41 and 43. The axially extending sections of the O-rings serve to subdivide the annular groove 35 into two separate, isolated, and distinct substantially semicircular portions 35a and 35b which serve as separate flow chambers to interconnect separate pairs of ports. The depths of the grooves containing the rings 45 and 47 and the cross sectional diameter of the rings (after stretching) are such that the ring cross sections are radially compressed when the assembly 23 is inserted into the bore 21, the degree of compression being sufficient to provide sealing against leakage at the fluid pressures to be encountered. The joint action of the pairs of arcuate portions of the two rings in grooves 33 and 37 plus the cross sections of the axial portions serve to seal against axial leakage (as would a single conventionally placed O-ring in grooves 33 and 37) while the axial portions 45 and 47 act with walls 27b and 27c to define sealed, separate fluid flow chambers 35a and 35b that are of a sufficient circumferential or arcuate extent to enable fluid to flow from, for example as in FIG. 4, port 5 to port 9 through chamber 35b and from port 11 to port 7 through chamber 35a. The O-rings are stretched on to the shank 27 and held in place by walls 27b and 27c (or grooves 33 and 37) so that each encompasses substantially one half the circumference of the shank. Because of the inherently good sealing characteristics and elastic nature of the elastomeric material of which the O-rings are made, precision machining of the grooves is not required, for example the grooves 33 and 37 can be wider than the O-ring thickness, since the elastic rings will adapt and adjust to their groove beds in the shank and continue to function as desired. Preferably, the grooves 41 and 43 cause a slight compressing of the ring sections 45 and 47 to help resist the inherent tendency of the rings to return to the shape of FIG. 5A after assembly on the shank and prior to insertion in the bore 21.

The spool assembly 23 is axially held in place in the valve body 3 by means of a snap ring 51 in groove 39 which shoulders against a washer ring 53 that movably fits on shank portion 27d and against the back face 55 of the body 3.

In operation, and referring to FIG. 4, with the spool in one extreme position as determined by pin 29 (FIG. 3), fuild flows from inlet port 5 through semi-annular chamber 35b to port 9 and from port 11 through semi-annular chamber 35a to outlet port 7. With the spool rotated 90° to the other extreme position, fluid flows from inlet port 5 through semi-annular chamber 35b to port 11 and from port 9 through semi-annular chamber 35a to outlet port 7.

The valve body 3 is preferably formed of plastic or equivalently soft material so that the axial portions of O-rings 45 and 47 are not abraded or worn as they pass by the edges of the ports 5, 7, 9, and 11 where they open into bore 21. FIGS. 6–7 illustrate an expedient that may be used when the body is made of metal or other material harder than plastic. In this case the valve 101 has a round body 103 with a through bore 105 that is fitted with a tubular liner or sleeve 107 of relatively soft material such as Nylon or Teflon. The sleeve 107 has four openings 109 that are aligned with four port means 11 which correspond to the four ports of the valve 1. The inside surface 113 of the sleeve therefore corresponds to the bore 21 and receives a spool assembly 115 that is the same as spool assembly 23 insofar as its handle 117 and its two O-ring and receiving groove means 119 combination is concerned. In this modification the pin and slot arrangement of FIG. 3 is replaced by a radial pin 121 at the end of the spool assembly which bears against washer 123 to serve the axial restraint function of snap ring 51 and contacts pins 125 and 127 which project from body 103 (FIG. 6) to define the limits of angular movement of the spool assembly.

In accordance with the invention, the O-ring is mounted on the movable member so that the O-ring axis is transverse or perpendicular to the member axis in contrast to the conventional O-ring mounting wherein it is coaxial with the member.

Modifications in the spool valve assembly illustrated in FIGS. 1–7 are within the scope of the invention. Where 360° sealing is not required by the O-ring arrangement or where other seal means are provided, there may be applications in which only one axially extended O-ring is required to give the function desired. On the other hand, more than two axially extended O-rings may be used as illustrated in FIG. 8 which is a cross section corresponding to the central portions of FIG. 4. In this case the valve 201 has a body 203 with four ports 205 and a spool assembly 207 having annular grooves corresponding to grooves 33 and 37 and four axial grooves 209 corresponding to the two grooves 41 and 43. The spool assembly therefore can support in stretched on condition four O-rings 211, 213, 215, and 217 each of which covers about one quarter of the circumference of the spool shank 219. The shank may be provided with diametral cross passages 221 and 223 to interconnect opposite ports in order to provide the particular flow arrangements to be controlled by the valve 201.

While the invention has been illustrated in connection with a rotary valve spool, the principle involved in this type of O-ring usage is applicable to other movable members where sealing is desired, such as slide valves which may even have non-circular cross sections. Also, while the circular, common type of O-ring is illustrated, it is apparent that other annulus shapes and cross sections might be used as equivalents if economically feasible.

I claim:

1. In a valve having a body with a cylindrical bore and a plurality of ports opening into said bore, a generally cylindrical spool assembly rotatably mounted in said bore to control flow between said ports, said spool assembly comprising a spool member and an elastomeric O-ring member mounted on the spool member, said O-ring member being stretched lengthwise of the spool member and secured thereto so that it extends substantially less than all the way around the circumference of the spool member, said O-ring member sealingly engaging the wall of said bore and being rotatable with the spool assembly to pass across from one side to the other of at least one of said ports and provide means for flow control for said one port.

2. In a valve as set forth in claim 1, groove means formed in the spool member, said O-ring member being seated in said groove means and the walls of said groove means serving to hold the O-ring in said condition of being stretched lengthwise of the spool member.

3. In a valve as set forth in claim 2, said groove means encompassing no more than about one half the circumference of the spool member and said O-ring encompassing no more than about one half the circumference of the spool member.

4. A valve assembly for insertion into a valve bore of a valve body to control flow between ports in the body opening into the bore, said assembly comprising an elongated member having an outer surface with groove means therein, said groove means including transversely spaced groove sections extending lengthwise of the body and longitudinally spaced groove sections extending transversely to the length of the body, an elastomeric O-ring in its relaxed, unstressed state an inner diameter substantially less than the longitudinal distance between said transversely extending groove sections, said O-ring being disposed in stretched condition in said groove means on said body so that it has longitudinally extending elastically stretched portions in said longitudinal groove sections and transversely extending portions in said transverse groove sections holding said longitudinally extending O-ring portions in stretched condition, said O-ring projecting above the outer surface of the elongated member whereby it can sealingly engage the wall of the bore.

5. A fluid flow control valve comprising a body having a valve bore and a plurality of fluid flow ports opening into said bore, a movable valve means in said bore for controlling flow from one of said ports to another of said ports, said valve means comprising a valve member and characterized by an elastic O-ring supported thereon in stretched condition and extending over only a part of but not all of the circumference of the valve member, said O-ring movably engaging the wall of the bore.

6. A valve as set forth in claim 5 and further characterized by spaced walls formed in said member and acting with spaced portions of said O-ring to form a movable fluid flow chamber of sufficient length to provide for fluid flow from one port to another port when said valve means is in a predetermined position relative to said ports.

7. A rotary fluid flow control valve comprising a body having a cylindrical bore and a plurality of fluid flow ports opening into said bore, a generally cylindrical spool assembly rotatably mounted in said bore to control flow among said ports, said spool assembly comprising a spool member having a longitudinal axis and first and second annular grooves substantially concentric with said axis and axially separated along the length of said axis, a plurality of axially extending grooves on each of the opposite diametral sides of said first and second annular grooves intersecting said annular grooves, a plurality of elastomeric O-rings having a smaller diameter in relaxed unstressed condition than the longitudinal distance between said first and second annular grooves, said O-rings being longitudinally stretched to each seat at opposite ends in said first and second annular grooves and longitudinally stretched to have side by side longitudinally extending portions seated in said axially extending grooves, said O-rings being circumferentially separated from each other on the spool member and each extending substantially less than 360° around the circumference and each of the spool members engaging the wall of said bore, said spool member having an annular groove located between said first and second annular grooves and acting with said longitudinally extending O-ring portions to define a plurality of flow chambers serving to provide fluid communication between a plurality of said flow ports upon movement of said spool assembly to a selected angular position.

8. A valve as set forth in claim 7 wherein said O-rings are circular in shape and circular in cross section in their relaxed, unstressed state.

9. A valve as set forth in claim 7 wherein there are two only of said O-rings and each extends around substantially one half the circumference of the spool member.

10. A valve as set forth in claim 7 wherein there are four only of said O-rings and each extends around substantially one quarter of the circumference of the spool member.

11. A valve as set forth in claim 7 including means associated with the spool assembly and the body for restricting the extent of rotary movement of the spool assembly to a predetermined angle.

12. A valve as set forth in claim 11 including means associated with the spool and the body for holding the spool assembly in a substantially fixed axial position relative to the body.

13. A valve as set forth in claim 11 wherein said means comprises a recess in a face of the body and a pin on the spool assembly movable in the recess, said spool assembly having a handle portion outside the body covering the recess.

14. A valve as set forth in claim 11 wherein said means comprises a pair of projections on the body and a pin on the spool assembly disposed between the projections and located to contact them at the opposite extremes of rotary movement of the spool assembly.

15. A valve as set forth in claim 14 wherein said pin on said spool assembly is on one end of the spool assembly and said spool assembly has a handle at the other end and said pin and handle provides a means for holding the spool assembly in a substantially fixed axial position relative to said body.

16. In a valve or the like, a body having an aperture with a wall, a member movable in said aperture and having a longitudinal axis, said member having projections on the outside thereof, an O-ring fitted over said projections and held in elastically stretched condition thereby and engaging said wall, said O-ring having an axis and its axis extending transversely to said longitudinal axis.

17. The invention as set forth in claim 16 wherein said O-ring axis extends at substantially a right angle to said longitudinal axis.

* * * * *